United States Patent
Konoshima et al.

(10) Patent No.: US 9,704,100 B2
(45) Date of Patent: Jul. 11, 2017

(54) AUTHENTICATION METHOD, AUTHENTICATION DEVICE, AND RECORDING MEDIUM

(71) Applicant: FUJITSU LIMITED, Kawasaki-shi, Kanagawa (JP)

(72) Inventors: Makiko Konoshima, Kawasaki (JP); Yui Noma, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 24 days.

(21) Appl. No.: 14/814,014

(22) Filed: Jul. 30, 2015

(65) Prior Publication Data

US 2016/0034821 A1   Feb. 4, 2016

Related U.S. Application Data

(63) Continuation of application No. PCT/JP2013/052418, filed on Feb. 1, 2013.

(51) Int. Cl.
*G06F 9/44* (2006.01)
*G06N 7/02* (2006.01)
*G06N 7/00* (2006.01)
*G06N 99/00* (2010.01)
*G06F 17/18* (2006.01)
*G06F 17/30* (2006.01)

(52) U.S. Cl.
CPC .............. *G06N 7/005* (2013.01); *G06F 17/18* (2013.01); *G06F 17/30536* (2013.01); *G06N 99/005* (2013.01)

(58) Field of Classification Search
None
See application file for complete search history.

(56) References Cited

U.S. PATENT DOCUMENTS

2015/0169644 A1* 6/2015 Gong ................ G06F 17/30277
707/769

FOREIGN PATENT DOCUMENTS

| JP | 2006-252333 | 9/2006 |
| JP | 2007-4458   | 1/2007 |
| JP | 2010-61176  | 3/2010 |

OTHER PUBLICATIONS

Heo et al. "Spherical hashing", CVPR, Jul. 2012, pp. 2957-2964.*
Datar et al., "Locality-Sensitive Hashing Scheme Based on p-Stable Distributions", *SCG '04 Proceedings of the Twentieth Annual Symposium on Computational Geometry*, Jun. 9, 2004, pp. 253-262.

(Continued)

*Primary Examiner* — Li-Wu Chang
(74) *Attorney, Agent, or Firm* — Staas & Halsey LLP

(57) ABSTRACT

An information conversion method includes: first moving positions of a plurality of particles on a unit sphere according to a value of a probability density function, defining a positional vector of a particle on the unit sphere in a multidimensional space, as a normal vector of a hyperplane configured to divide a feature vector space, defining a predetermined evaluation function configured to evaluate the hyperplane, as the probability density function configured to indicate a probability of existence of a particle on the unit sphere, by a processor; and converting the feature vector to a binary string, considering a positional vector of the moved particle as a normal vector of the hyperplane, by the processor.

9 Claims, 11 Drawing Sheets

(56) References Cited

OTHER PUBLICATIONS

Norouzi et al., "Minimal Loss Hashing for Compact Binary Codes", *Proceedings of the 28th International Conference on Machine Learning*, Jun. 28, 2011.
Gilad-Bachrach et al., "Margin Based Feature Selection—Theory and Algorithms", *Proceedings of the 21st International Conference on Machine Learning*, Jul. 4, 2004.
Konoshima, "Locality-Sensitive Hashing With Margin Based Feature Selection", *IEICE Technical Report*, Jun. 12, 2012, vol. 112, No. 83, pp. 41-47.
Konoshima et al., "Locality-Sensitive Hashing With Margin Based Feature Selection", Retrieved from the Internet: <URL:http://arxiv.org/pdf/1209.5833v2>, Oct. 11, 2012, pp. 1-9.
Nagata et al., "On the behavior of average of acceptance rate for Metropolis algorithm", *IEICE Technical Report*, Nov. 2, 2011, vol. 111, No. 275, pp. 237-242.
Nakatsuma, "Introduction to Bayesian Statics" first edition, Asakura Publishing Co., Ltd., Jun. 10, 2007, pp. 162-175.
Terasawa et al., "Spherical LSH for Approximate Nearest Neighbor Search on Unit Hypersphere", *Algorithm and Data Structures*, Lecture Notes in Computer Science, 2007, vol. 4619, pp. 27-38.
International Search Report mailed Mar. 19, 2013, in corresponding International Application No. PCT/JP2013/052418.
Konoshima et al., "Hyperplane Arrangements and Locality-Sensitive Hashing with Lift", Dec. 26, 2012, Retrieved from the URL: https://arxiv.org/pdf/1212.6110.pdf on Feb. 24, 2017, pp. 1-16.
Konoshima et al., "Locality-Sensitive Hashing with Margin Based Feature Selection", IEICE Technical Report, vol. 83, No. 112, Oct. 11, 2012 pp. 1-9.
Schrack et al., "Optimized Relative Step Size Random Searches", Mathematical Programming, vol. 10, North-Holland Publishing Company, Jun. 29, 1974, pp. 230-244.
Hastings, "Monte Carlo Sampling Methods Using Markov Chains and Their Applications", Biometrika, Stor, vol. 57, No. 1, pp. 97-109.
Woodbridge et al., "A Monte Carlo Approach to Biomedical Time Series Search", IEEE International Conference on Bioinformatics and Biomedicine (BIBM), 2012, pp. 1-6.
Extended European Search Report issued by the European Patent Office dated Apr. 6, 2017 in corresponding European patent application No. 13874037.8.

\* cited by examiner

| DATA ID | FEATURE VECTOR | LABEL |
|---------|----------------|-------|
| 1 | a,b,c··· | A |
| 2 | d,e,f··· | B |
| ⋮ | ⋮ | ⋮ |

US 9,704,100 B2

AUTHENTICATION METHOD, AUTHENTICATION DEVICE, AND RECORDING MEDIUM

CROSS-REFERENCE TO RELATED APPLICATION

This application is a continuation application of International Application PCT/JP2013/052418, filed on Feb. 1, 2013, and designating the U.S., the entire contents of which are incorporated herein by reference.

FIELD

The present invention relates to an information conversion method, an information conversion device, and an information conversion program.

BACKGROUND

Conventionally, a technology for speeding up retrieval processing is known which is achieved by relaxing strictness using feature vectors representing features of data such as finger print, image, sound, or the like to retrieve similar data. As one example of such a technology, a method for reducing calculation cost is known by which the feature vectors are converted to binary strings, while holding a distance relationship between the feature vectors, and a Hamming distance is calculated between the binary strings.

Further, as one example of a technique for converting the feature vectors to the binary strings while maintaining the distance relationship between the feature vectors, a technology of locality-sensitive hashing (LSH) is known. For example, an information processing apparatus sets a plurality of hyperplanes for dividing a feature vector space, and converts feature vectors to binary strings each representing whether an inner product of a normal vector and a feature vector of a hyperplane is positive or negative. That is, the information processing apparatus uses the hyperplane to divide the feature vector space into a plurality of areas, and converts a feature vector to a binary string representing that the feature vector belongs to which of the divided areas.

Here, when a label representing similarity, such as an ID for identification of an individual person registering data, is applied to each data, a hyperplane for classifying each data according to labels is preferably set to facilitate classification of new data to be registered. Therefore, a technology is known in which a data pair to which the same label is applied, and a data pair to which different labels are applied are used to learn a set of hyperplane for classifying each data according to labels.

For example, an information processing apparatus selects two feature vectors to which the same label is applied (hereinafter, described as a positive example pair), and two feature vectors to which different labels are applied (hereinafter, described as a negative example pair) from feature vectors to be classified. Then, the information processing apparatus repeatedly optimizes set of hyperplanes so that the positive example pair has a small Hamming distance, and the negative example pair has a large Hamming distance, to learn the set of hyperplane for classifying each data according to labels.

Patent Document 1: Japanese Laid-open Patent publication No. 2006-252333
Patent Document 2: Japanese Laid-open Patent publication No. 2010-061176
Patent Document 3: Japanese Laid-open Patent publication No. 2007-004458
Non Patent Document 1: M. Datar, N. Immorlica, P. Indyk, V. S. Mirrokni: Locality-Sensitive Hashing Scheme Based on p-Stable Distributions, Proceedings of the twentieth annual symposium on Computational geometry (SCG 2004)
Non Patent Document 2: M. Norouzi and D. Fleet: Minimal Loss hashing for compact binary codes, Proceedings of the 28th International Conference on Machine Learning (ICML '11) (2011)

Here, in order to improve accuracy of distance relationship upon conversion to the binary string, it is only requested to increase the number of hyperplanes to be set. However, in the technology for learning the set of hyperplanes, when the number of hyperplanes is increased, the amount of calculation is increased to optimize the set of hyperplanes, so that learning of the set of hyperplane for classifying each data according to labels is disadvantageously made difficult.

Whereas, when a plurality of hyperplanes are optimized individually, hyperplanes similarly dividing the feature vector space are apt to be learned, and the accuracy of distance relationship is deteriorated.

SUMMARY

According to an aspect of the embodiments, an information conversion method includes: first moving positions of a plurality of particles on a unit sphere according to a value of a probability density function, defining a positional vector of a particle on the unit sphere in a multidimensional space, as a normal vector of a hyperplane configured to divide a feature vector space, defining a predetermined evaluation function configured to evaluate the hyperplane, as the probability density function configured to indicate a probability of existence of a particle on the unit sphere, by a processor; and converting the feature vector to a binary string, considering a positional vector of the moved particle as a normal vector of the hyperplane, by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An information conversion method, an information conversion device, and an information conversion program according to the present application will be described below with reference to the accompanying drawings.

First Exemplary Embodiment

Figure 1:
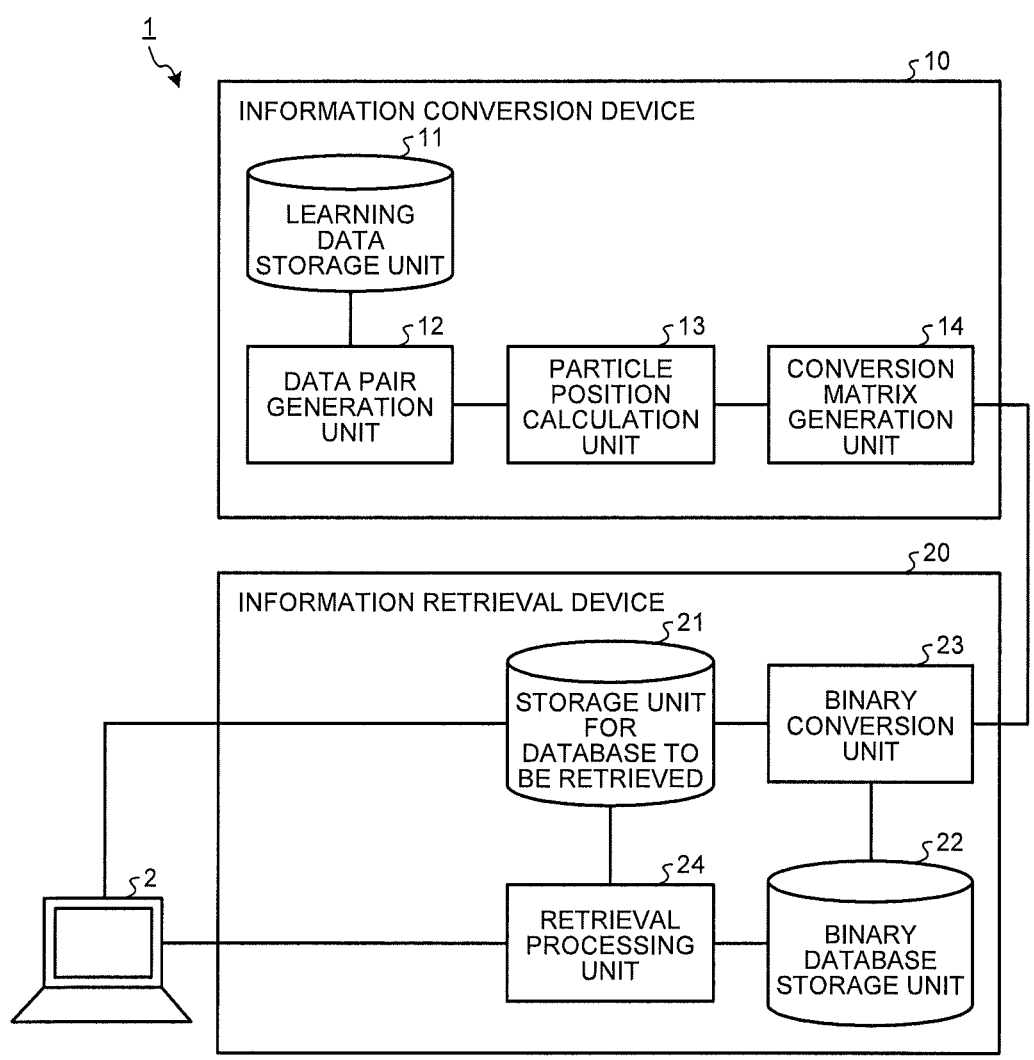
FIG. 1 is a diagram for illustrating a retrieval system according to a first exemplary embodiment.

In the following first exemplary embodiment, an example of a retrieval system having the information conversion device will be described, using FIG. 1. FIG. 1 is a diagram for illustrating the retrieval system according to the first exemplary embodiment. As illustrated in FIG. 1, a retrieval system 1 includes a client device 2, an information conversion device 10, and an information retrieval device 20.

Further, the information conversion device 10 includes a learning data storage unit 11, a data pair generation unit 12, a particle position calculation unit 13, and a conversion matrix generation unit 14. Further, the information retrieval device 20 includes a storage unit 21 for database to be retrieved, a binary conversion unit 23, a binary database storage unit 22, and a retrieval processing unit 24.

When receiving query data from the client device 2, the retrieval system 1 illustrated in FIG. 1 retrieves neighbor data to the query data from the storage unit 21 for database to be retrieved. The retrieval system 1 is a system for reporting to the client device 2 whether similar data is registered in the vicinity of the query data. Specifically, in the retrieval system 1, the information conversion device 10 generates a conversion matrix, and the information retrieval device 20 converts data to be retrieved to a binary string, using the conversion matrix, and retrieves the neighbor data to the query data, using the binary string obtained after the conversion.

Here, the data to be retrieved in the retrieval system 1 is data such as image, sound, or the like, and a biological data in biometric authentication using a fingerprint pattern or a veinprint pattern. That is, the retrieval system 1 is a system for, when receiving a biological data of a user input to the client device 2 as the query data, determining whether the biological data of the user is registered.

It is noted that various image or sound features have been proposed, but the retrieval system 1 does not depend on specific features, so that arbitrary features are allowed to be used. For example, SIFT features or SURF features are also allowed to be used which are generally used as the image features. These features are known to be robust to occlusion or variation by using local information in an image as a feature vector. The feature vector of arbitrary type indicating such features may be used.

Figure 2:
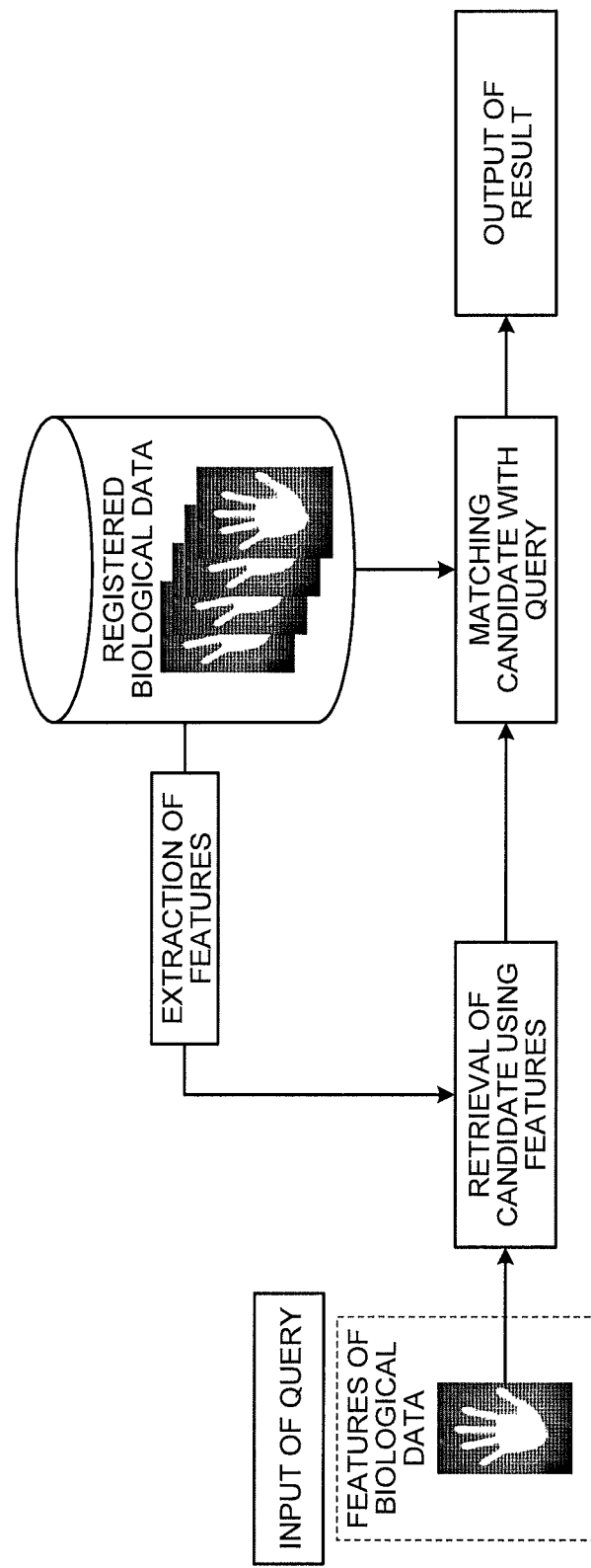
FIG. 2 is a diagram for illustrating an example of biometric authentication.

FIG. 2 is a diagram for illustrating an example of the biometric authentication. It is noted that, in the example illustrated in FIG. 2, processing in ID-less 1:N authentication is illustrated in which information such as a user identification (ID) is not input, and sets of biological data are not narrowed down using the user ID. As illustrated in FIG. 2, the retrieval system 1 stores a plurality of sets of registered biological data by a plurality of users.

When receiving, as the query data, biological data from the client device 2, the retrieval system 1 extracts feature vectors indicating features of the input biological data, and retrieves a registered biological data having feature vectors similar to the extracted feature vectors. That is, the retrieval system 1 determines whether the biological data of the user inputting the query data is registered.

Further, the retrieval system 1 generates the conversion matrix for converting a feature vector to a binary string having a predetermined bit length, and uses the generated conversion matrix to convert a feature vector of the registered biological data to a binary string. Further, the retrieval system 1 converts the feature vectors in the biological data input as the query data to a binary string having a predetermined bit length, and calculates the Hamming distance between the binary string obtained from the query data and the binary string obtained by the conversion of the feature vectors of the registered biological data.

The retrieval system 1 extracts, as a candidate object to be retrieved, a registered biological data having a Hamming distance not more than a predetermined threshold. Then, the retrieval system 1 performs strict matching of the retrieved registered biological data with the biological data input as the query data, and outputs a result of the strict matching to the client device 2.

As described above, the retrieval system 1 converts the feature vector indicating a feature of the registered biological data to be retrieved to a predetermined binary string, calculates the Hamming distance between the binary string obtained from the registered biological data and the binary string obtained by converting the feature vector of the query data, and narrow down the data to be retrieved. The retrieval system 1 performs matching of the data narrowed down with the query data to perform matching in the biometric authentication.

It is noted that, when the input biological data or the registered biological data is an image, the feature vector has vectorized values of such as, a density or coordinates of featured points, a direction, a length, or a gradient of a ridge in a specific are in an image, or a terminal end or branch of the ridge. Further, the input biological data or the registered biological data is sound, the feature vector has vectorized values of, such as, distribution, intensity, or a peak value of frequency components.

Processing performed by the information conversion device 10, and processing performed by the information retrieval device 20 will be described below. Returning to FIG. 1, the information conversion device 10 uses learning data stored in the learning data storage unit 11 to generate the conversion matrix for converting the feature vector to the binary string having a predetermined bit length, and reports the generated conversion matrix to the information retrieval device 20.

Here, the conversion matrix represents a matrix having, as a row component, a normal vector of the hyperplane dividing a feature vector space into a plurality of areas, and the matrix is used when the information retrieval device 20 converts the feature vector to the binary string. For example, the information retrieval device 20 calculates multiplication of the feature vector by the conversion matrix to obtain a product. Then, the information retrieval device 20 determines whether each component of the product of the calculated multiplication has a positive value or negative value, and the binary string is generated in which when the component has a positive value, the component is expressed as "1", and when the component has a negative value, the component is expressed as "0". That is, the information retrieval device 20 uses the conversion matrix to convert each feature vector to the binary string indicating which area of the feature vector space divided into a plurality of areas by the hyperplane, the feature vector belongs to.

Here, in order to facilitate classification of new data to be registered, a hyperplane for classifying each data according to labels is preferably set. Further, the binary string is information indicating which side of each hyperplane the feature vector is, so that when similar hyperplanes are set, the number of redundant bit strings is increased, and accuracy in distance relationship is deteriorated. Therefore, the hyperplanes are preferably set to divide the feature vector space into different areas.

Here, a technique for optimizing a plurality of hyper planes are considered. In the technique, a positive example pair being a set of feature vectors to which the same label is applied, and a negative example pair being a set of feature vectors to which different labels are applied are used to simultaneously evaluate the plurality of set hyperplanes. However, since the amount of calculation is increased, it has been difficult to learn a set of hyperplanes in order to simultaneously optimize the plurality of hyperplanes.

Therefore, the information conversion device 10 arranges particles are disposed to have the same number as that of the hyperplanes to be set, on a unit sphere having a dimensional number the same as that of the hyperplane, and conducts a random walk on the particles, considering an evaluation function for evaluation of the hyperplane as a probability density function indicating a probability of existence of a particle on the unit sphere. Then, as a result of the random walk, the information conversion device 10 considers a positional vector of a particle moved to a position at which the probability density function has a maximum value, as the normal vector of the hyperplane.

Figures 3, 4:
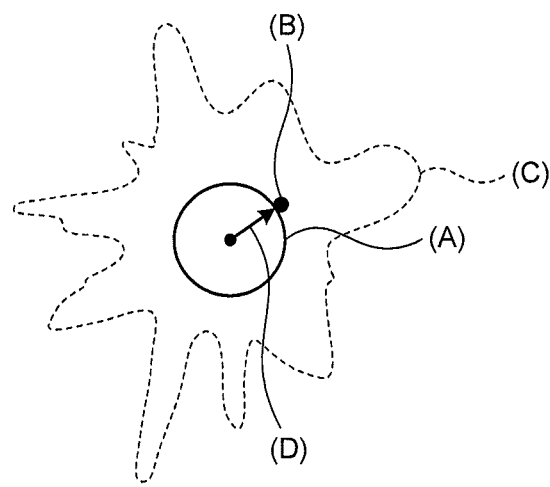
FIG. 3 is a diagram for illustrating an effect of a random walk.
FIG. 4 is a table for illustrating an example of data stored in a learning data storage unit.

Here, FIG. 3 is a diagram for illustrating an effect of random walk. It is noted that, in an example illustrated in FIG. 3, a unit ball having a dimensional number the same as that of the hyperplane is two-dimensionally projected. For example, the information conversion device 10 arranges a particle indicated by (B) in FIG. 3 on a unit sphere indicated by (A) in FIG. 3 Further, the information conversion device 10 considers the evaluation function for evaluation of the hyperplane as the probability density function, as indicated by (C) in FIG. 3. Then, the information conversion device 10 conducts the random walk on the particle on the unit sphere.

When such a random walk is conducted, the particle tends to stay at the position at which the probability density function has the maximum value. Therefore, the information conversion device 10 considers a positional vector of a particle moved, by the random walk, to a position at which the probability density function has a maximum value, as the normal vector of the hyperplane, to obtain the normal vector of the hyperplane having the maximum value of the evaluation function, as indicated by (D) in FIG. 3

Further, when a plurality of particles are arranged on the unit sphere at random, and the random walk is conducted on the particles, each particle tends to stay, in the vicinity of an initial arrangement of the particle, at a position at which the probability density function has the maximum value. That is, as a result of the random walk, the particles have a low probability of movement to the same position.

Therefore, the information conversion device 10 arranges a plurality of particles on the unit sphere, and considers the evaluation function for evaluation of the hyperplane as the probability density function to conduct the random walk on individual particle. That is, the information conversion device 10 considers the plurality of positional vectors of the particles on the unit sphere as the normal vectors of the hyperplanes, and the evaluation function as the probability density function, and performs sampling according to a Markov chain Monte Carlo method. The information conversion device 10 considers the positional vector at the position to which each particle is moved, as the normal vector of the hyperplane to readily optimize the set of hyperplanes without solving the problem of the optimization of the evaluation function about the set of hyperplanes. Further, the information conversion device 10 is allowed to apply a non-negative integrable function to the evaluation function.

Next, a description will be made of processes of the learning data storage unit 11, a data pair generation unit 12, the particle position calculation unit 13, and the conversion matrix generation unit 14 of the information conversion device 10. Returning to FIG. 1, the learning data storage unit 11 stores learning data for learning of hyperplane by the information conversion device.

Specifically, the learning data storage unit 11 stores, as learning data, a plurality of feature vectors for each user. Here, the feature vectors stored in the learning data storage unit 11 is part of feature vectors stored in the storage unit 21 for database to be retrieved, described later. That is, the learning data storage unit 11 partially stores feature vectors of the registered biological data registered in the retrieval system 1.

Here, FIG. 4 is a table for illustrating an example of data stored in the learning data storage unit. As illustrated in FIG. 4, the learning data storage unit 11 stores a data identification (ID) in association with the feature vectors and the label. Here, the data ID represents a data identifier applied to each data. Further, the label represents information indicating similarity between feature vectors, and, for example, represents information indicating a user registering the biological data or the like being a source of each feature vector.

For example, in an example illustrated in FIG. 4, as the feature vectors, the learning data storage unit 11 stores 4000-dimensional floating point data "a, b, c . . . " which is feature vectors indicated by a data ID "1", and to which a label "A" is applied. Further, the learning data storage unit 11 stores, as the feature vectors, 4000 dimensional floating point data "d, e, f . . . " which is feature vectors indicated by a data ID "2", and to which a label "B" is applied.

Returning to FIG. 1, the data pair generation unit 12 collects data pairs used for learning the hyperplane, from the learning data stored in the learning data storage unit 11. Specifically, the data pair generation unit 12 selects a plurality of the positive example pairs being two feature vectors to which the same label is applied, from the feature vectors stored in the learning data storage unit 11. Further, the data pair generation unit 12 selects a plurality of the negative example pairs being two feature vectors to which different labels are applied, from the feature vectors stored in the learning data storage unit 11. Then, the data pair generation unit 12 outputs the selected positive example pairs and the negative example pairs to the particle position calculation unit 13.

The particle position calculation unit 13 considers a predetermined evaluation function as the probability density function, and conducts the random walk on the plurality of particles on the unit sphere having a dimensional number the same as that of the hyperplane to calculate a positional vector at a position at which the probability density function has a maximum value. Specifically, the positive example pair and the negative example pair are received from the data pair generation unit 12. Further, the particle position calculation unit 13 arranges, at random, the particles having the same number as that of the hyperplanes set on the unit sphere having a dimensional number the same as that of the hyperplane. Then, the particle position calculation unit 13 performs the following Markov chain Monte Carlo methods (MCMC) for each particle arranged on the unit sphere.

First, the particle position calculation unit 13 uses the positive example pair and the negative example pair received from the data pair generation unit 12, to calculate a value of the evaluation function, for a hyperplane having a current positional vector of a particle as a normal vector. Next, the particle position calculation unit 13 extracts a candidate position as a movement destination of the particle. It is noted that, as a content of extraction processing of the candidate, a method of moving the particle by a predetermined distance, or a method of extracting a candidate position from a proposal distribution using a Metropolis-Hastings algorithm are considered.

Next, the particle position calculation unit 13 uses the positive example pair and the negative example pair received from the data pair generation unit 12 to calculate a value of the evaluation function, for the hyperplane having a positional vector of the extracted candidate position as a normal vector. Specifically, the particle position calculation unit 13 counts the number of positive example pairs having a feature vector not divided by the hyperplane having a positional vector of the candidate position as a normal vector. Further, the particle position calculation unit 13 counts the number of negative example pairs having a feature vector divided by the hyperplane having a positional vector of the candidate position as a normal vector. Then, the particle position calculation unit 13 uses the number of positive example pairs calculated and the number of negative example pairs calculated to calculate a value for evaluation of the hyperplane, or a value of the evaluation function.

Further, the particle position calculation unit 13 calculates a value obtained by dividing the value of the evaluation function calculated for the hyperplane having a positional vector of the candidate position as a normal vector, by the value of the evaluation function calculated for the hyperplane having a current positional vector of a particle as a normal vector. Then, the particle position calculation unit 13 calculates a random number having a value of not less than 0 and not more than 1, and when the calculated value is larger than the random number, the candidate position is defined as a new position of the particle. That is, the particle position calculation unit 13 moves the particle to a position at which the value of the evaluation function is increased, in consideration of randomness.

Figure 5:
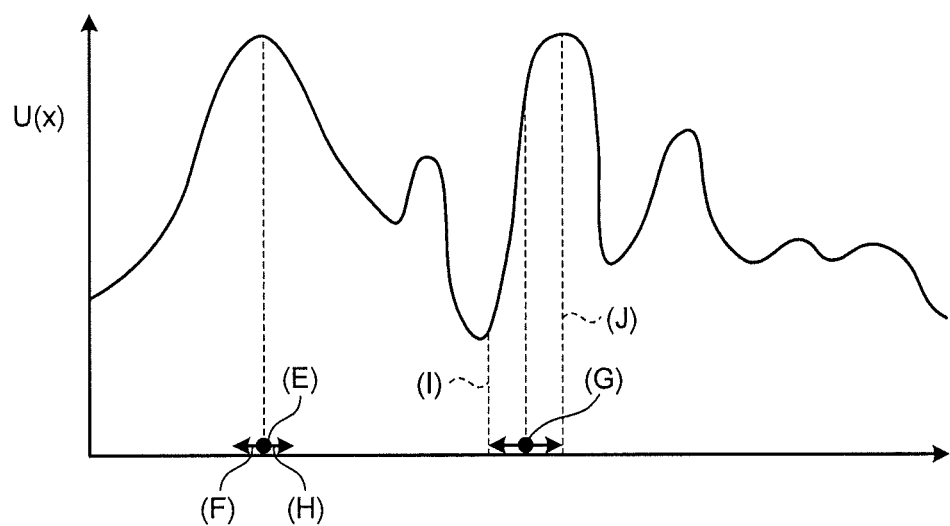
FIG. 5 is a graph for illustrating the contents of an MCMC method.

Here, FIG. 5 is a graph for illustrating the contents of the MCMC method. It is noted that, in FIG. 5, for easy understanding, each position on the unit sphere is one-dimensionally projected on a horizontal axis, and a value of the evaluation function $U(x)$ is plotted on a vertical axis. For example, the particle position calculation unit 13 selects a position indicated by (F) in FIG. 5, as the candidate position to which the particle indicated by (E) in FIG. 5 is to be moved.

The particle position calculation unit 13 obtains a value of the evaluation function $U(x)$, using the positional vector of the candidate position as the normal vector of the hyperplane. Next, the particle position calculation unit 13 calculates the value obtained by dividing the value of the evaluation function $U(x)$ obtained by calculating the positional vector of the candidate position as the normal vector of the hyperplane, by the value of the evaluation function $U(x)$ obtained by calculating the positional vector of the current position as the normal vector of the hyperplane. Then, the particle position calculation unit 13 determines whether a result of the division is larger than the random number of not less than 0 and not more than 1.

Here, since the particle indicated by (E) in FIG. 5 is arranged at a position at which the value of $U(x)$ has a maximum value, the value of $U(x)$ at the candidate position is smaller than the value of $U(x)$ at the current position. Therefore, as a result of the division, the particle has a value of not more than 1, and has a high probability of having a value smaller than the random number. Therefore, the particle indicated by (E) in FIG. 5 has a low probability of moving to the position indicated by (F) in FIG. 5.

Similarly, further when a position indicated by (H) in FIG. 5 is selected as the candidate position for the particle indicated by (E) in FIG. 5, the value of the evaluation function is reduced, so that the particle has a low probability of moving to the candidate position. Therefore, as a result of the random walk, the particle indicated by (E) in FIG. 5 has a low probability of moving to another position, and has a high probability of staying at the position having the maximum value of the evaluation function.

Meanwhile, random walk of a particle indicated by (G) in FIG. 5 will be considered. For example, in an example illustrated in FIG. 5, when a candidate position for the particle indicated by (G) in FIG. 5 is defined as a position indicated by (I) in FIG. 5, the value of the evaluation function $U(x)$ is smaller than a current value. Whereas, when the candidate position for the particle indicated by (G) in FIG. 5 is defined as a position indicated by (J) in FIG. 5, the value of the evaluation function $U(x)$ is larger than the current value. Here, when the value of the evaluation function $U(x)$ at the candidate position is larger than the value of the evaluation function $U(x)$ at the current position, a result of the division is larger than 1, so that the candidate position is defined as a new position of the particle indicated by (G) in FIG. 5. Therefore, as indicated by (G) in FIG. 5, the particle at a position not having the maximum value of the evaluation function $U(x)$ tends to move toward the position having the maximum value of the evaluation function $U(x)$, as a result of the random walk.

As described above, when a plurality of particles are arranged on a unit sphere, and the random walk is conducted on individual particle, the particles have a low probability of moving to the same position, and have a high probability of moving to a position at which the evaluation function has a maximum value. Therefore, the particle position calculation unit 13 arranges a plurality of particles on the unit sphere to conduct the random walk on individual particle, and defines the positional vector of each particle as the normal vector of the hyperplane, so that the set of hyperplanes not similar and each having the maximum value of the evaluation function is readily calculated. Further, even if a differentiable evaluation function is not obtained, the particle position calculation unit 13 may readily calculate a set of the normal vectors which may have a maximum value of the evaluation function.

It is noted that the particle position calculation unit 13 is allowed to use, as the probability density function, an arbitrary evaluation function which has a small value when the hyperplane is between the positive example pair, and has a large value when the hyperplane is between the negative example pair. A plurality of examples of the evaluation function used by the particle position calculation unit 13 will be described below.

For example, the particle position calculation unit 13 counts the number of positive example pairs having both feature vectors in any of two areas divided by the hyperplane. Specifically, the particle position calculation unit 13 defines the angle of the normal vector and the angle of each feature vector included in the positive example pair as $\theta_1(p)$ and $\theta_2(p)$, respectively, and defines the number of positive example pairs having a positive value of $\cos(\theta_1(p)) \times \cos(\theta_2(p))$ as "#PP$_+$".

Further, the particle position calculation unit 13 counts the number of negative example pairs in which the hyperplane having the positional vector of the particle as the normal vector divides the feature vectors into different areas, of the negative example pairs received from the data pair generation unit 12. Specifically, the particle position calculation unit 13 defines the angles of the normal vector and each feature vector included in the negative example pair, as $\theta_1(p)$ and $\theta_2(p)$, respectively. The particle position calculation unit 13 defines the number of negative example pairs having a negative value of $\cos(\theta_1(p)) \times \cos(\theta_2(p))$, as "#NP$_-$".

Further, the particle position calculation unit 13 uses the following formula (1) to calculate a value of a variable x. That is, the particle position calculation unit 13 calculates the sum of the number of positive example pairs having both feature vectors in any of two areas, and the number of negative example pairs having the feature vectors divided into different areas. Then, a value of an evaluation function: $U(x)=\exp(x/T)$. Here, T represents an arbitrary parameter of for example "1".

$$x = \#PP_+ + \#NP_- \quad (1)$$

Further, the particle position calculation unit 13 may use a rate of the number of positive example pairs having both feature vectors in any of two areas divided, and a rate of the number of negative example pairs having the feature vectors divided into different areas to calculate the value of the evaluation function. For example, the particle position calculation unit 13 defines the number of positive example pairs received from the data pair generation unit 12 as "#PP", and the number of negative example pairs received from the data pair generation unit 12 as "#NP".

The particle position calculation unit 13 uses the following formula (2) to calculate a value of the variable x, and calculates the value of the evaluation function: $U(x)=\exp(x/T)$.

$$x = \frac{\#PP_+}{\#PP} + \frac{\#NP_-}{\#NP} \quad (2)$$

Further, the particle position calculation unit 13 may use another formula to calculate a value of the evaluation function. For example, the particle position calculation unit 13 calculates an absolute value of $\cos(\theta_1(p))+\cos(\theta_2(p))$ for all positive example pairs, and defines the sum of the calculated absolute values as D. Further, the particle position calculation unit 13 calculates an absolute value of $\cos(\theta_1(p))-\cos(\theta_2(p))$ for all negative example pairs, and defines the sum of the calculated absolute values as E.

Then, the particle position calculation unit 13 defines the sum of the calculated D and E as the value of x, and calculates the value of the evaluation function: $U(x)=\exp(x/T)$. That is, the particle position calculation unit 13 uses the following formula (3) to calculate the variable x, and uses the calculated value of the variable x to calculate the value of the evaluation function U(x).

$$x = \sum_{p \in PP} |\cos(\theta_1(p)) + \cos(\theta_2(p))| + \sum_{p \in NP} |\cos(\theta_1(p)) - \cos(\theta_2(p))| \quad (3)$$

Further, the particle position calculation unit 13 may calculate formula (3) considering the rate, similar to formula (2). For example, the particle position calculation unit 13 calculates the absolute value of $\cos(\theta_1(p))+\cos(\theta_2(p))$ for all positive example pairs, and defines the sum of the calculated absolute values as D. Further, the particle position calculation unit 13 calculates the absolute value of $\cos(\theta_1(p))-\cos(\theta_2(p))$ for all negative example pairs, and defines the sum of the calculated absolute values as E.

The particle position calculation unit 13 defines, as the value of x, the sum of a value obtained by dividing the calculated D by the number of positive example pairs "#PP", and a value obtained by dividing the calculated E by the number of negative example pairs "#NP", and calculates the value of the evaluation function U(x). That is, the particle position calculation unit 13 uses the following formula (4) to calculate the variable x, and uses the calculated value of the variable x to calculate the value of the evaluation function U(x).

$$x = \frac{1}{\#PP} \sum_{p \in PP} |\cos(\theta_1(p)) + \cos(\theta_2(p))| + \frac{1}{\#NP} \sum_{p \in NP} |\cos(\theta_1(p)) - \cos(\theta_2(p))| \quad (4)$$

As described above, the particle position calculation unit 13 considers the positional vector of the particle as the normal vector of the hyperplane, and calculates the value of the evaluation function having a value increasing according to the number of positive example pairs included in the same area by the hyperplane, and the number of negative example pairs divided into different areas by the hyperplane. The particle position calculation unit 13 defines the calculated value of the evaluation function as a value of the probability density function, and moves the particles on the unit sphere in a direction in which the value of the probability density function is increased. Therefore, the particle position calculation unit 13 is allowed to calculate the normal vectors of the set of hyperplanes not similar and each having the maximum value of the evaluation function, or the conversion matrix using a set of optimized hyperplanes, for the set of hyperplanes, without solving the problem of an optimum value of the evaluation function.

It is noted that the particle position calculation unit 13 conducts the above-mentioned random walk process on each particle, a predetermined number of times, and moves each particle to the position at which the probability density function has a maximum value. Then, the particle position calculation unit 13 outputs the positional vector of each particle to the conversion matrix generation unit 14.

Returning to FIG. 1, when receiving the positional vector calculated by the particle position calculation unit 13, the conversion matrix generation unit 14 generates a matrix having collection of received positional vectors, or the conversion matrix. For example, the conversion matrix generation unit 14 receives a plurality of positional vectors, and generates the conversion matrix having row vectors of the received positional vectors. Then, the conversion matrix generation unit 14 outputs the generated conversion matrix to the binary conversion unit 23 of the information retrieval device 20.

Next, processing performed by the information retrieval device 20 will be described. The storage unit 21 for database to be retrieved stores data to be retrieved, or feature vectors of the registered biological data. Specifically, the storage unit 21 for database to be retrieved stores data similar to that of the learning data storage unit 11. It is noted that the storage unit 21 for database to be retrieved may store a larger number of sets of data including the data stored in the learning data storage unit 11.

Further, the binary database storage unit 22 stores binary symbols obtained by converting the feature vectors using a predetermined conversion matrix, in association with the data IDs before conversion.

Returning to FIG. 1, when receiving the conversion matrix from the conversion matrix generation unit 14 of the information conversion device 10, the binary conversion unit 23 uses the received conversion matrix to convert the feature vector stored in the storage unit 21 for database to be retrieved to the binary string. The binary conversion unit 23 associates the converted binary string with the data ID having been associated with the feature vector being a conversion source, and stores the binary string to the binary database storage unit 22.

When receiving the query data from the client device 2, the retrieval processing unit 24 extracts the feature vectors representing the features of the received query data, and converts the extracted feature vectors to the binary string, using the predetermined conversion matrix. Then, the retrieval processing unit 24 retrieves, from the binary strings stored in the binary database storage unit 22, a binary string having a Hamming distance of not more than a predetermined value, or a binary string of feature vectors being a neighborhood candidate of the query data.

Thereafter, the retrieval processing unit 24 obtains the feature vectors being the conversion source of the retrieved binary string from the storage unit 21 for database to be retrieved. When the obtained feature vectors has a feature vector matching the feature vector extracted from the query data, or a feature vector having a Euclidean distance of not more than a predetermined threshold, the retrieval processing unit 24 performs the following processing. That is, the retrieval processing unit 24 transmits, to the client device 2, matching of the query data and the registered biological data.

Meanwhile, when the obtained feature vector does not have the feature vector matching the feature vector extracted from the query data, or the feature vector having a Euclidean distance of not more than a predetermined threshold, the retrieval processing unit 24 performs the following processing. That is, the retrieval processing unit 24 transmits, to the client device 2, non-matching of the query data and the registered biological data. Therefore, the client device 2 is allowed to perform the biometric authentication of the user inputting the query data.

For example, the data pair generation unit 12, the particle position calculation unit 13, the conversion matrix generation unit 14, the binary conversion unit 23, and the retrieval processing unit 24 employ an electronic circuit. Here, an integrated circuit such as an application specific integrated circuit (ASIC) or a field programmable gate array (FPGA), or a central processing unit (CPU), a micro processing unit (MPU), or the like are applied, as an example of the electronic circuit.

Further, the learning data storage unit 11, the storage unit 21 for database to be retrieved, and the binary database storage unit 22 employ a semiconductor memory device such as random access memory (RAM) or flash memory, or a storage device such as a hard disk or an optical disk.

Figure 6:
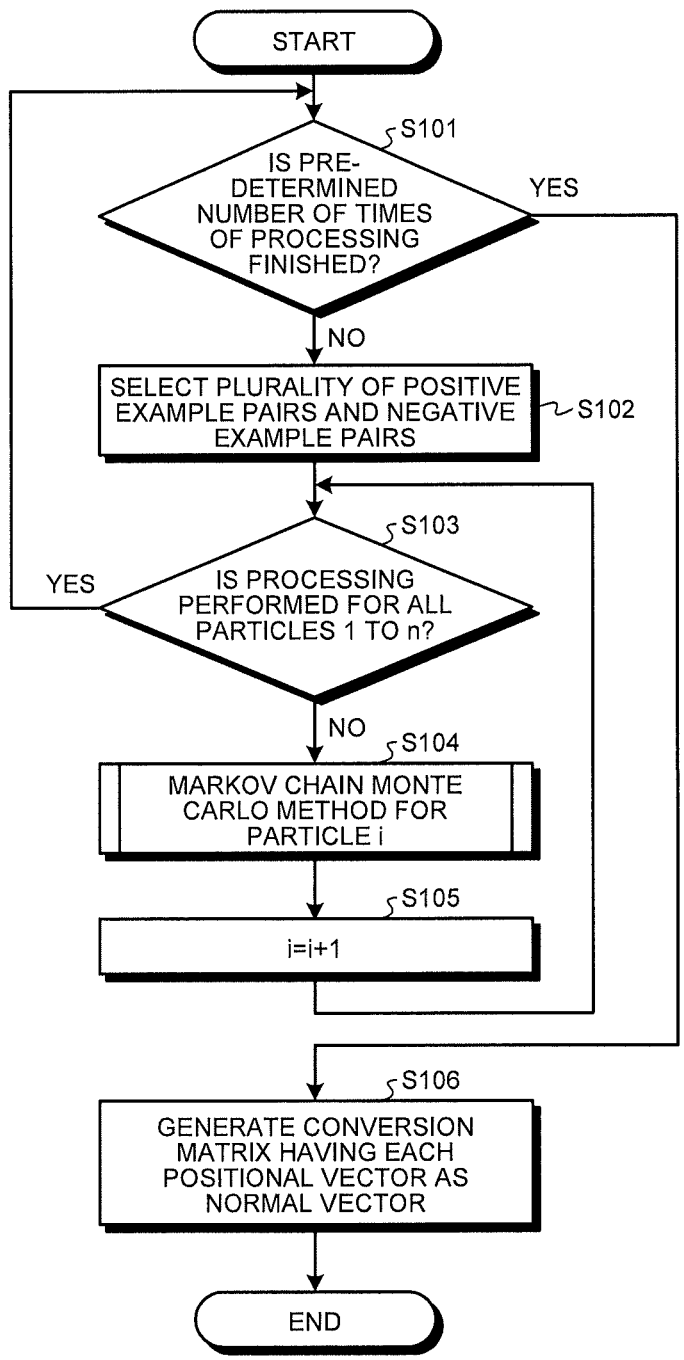
FIG. 6 is a flowchart for illustrating a flow of processing performed by an information conversion device.

Next, a flow of processing performed by the information conversion device 10 will be described using FIG. 6. FIG. 6 is a flowchart for illustrating a flow of processing performed by the information conversion device. It is noted that, in an example illustrated in FIG. 6, the information conversion device 10 having n particles 1 to n arranged on the unit sphere. First, the information conversion device 10 determines whether processes subsequent to step S102 are performed by a predetermined number of times (step S101).

When it is determined that the processes subsequent to step S102 are not performed by a predetermined number of times (step S101, No), the information conversion device 10 selects a plurality of positive example pairs and negative example pairs (step S102) from the learning data storage unit 11. Next, the information conversion device 10 determines whether the processes subsequent to step S102 are performed for all particles 1 to n (step S103). Then, when it is determined that the processes are not performed for all particles (step S103, No), the information conversion device 10 performs the Markov chain Monte Carlo method for a particle i (step S104).

Next, the information conversion device 10 adds 1 to the value of i (step S105), and performs the process of step S103 again. Further, when the process of step S104 is performed for all particles 1 to n (step S103, Yes), the information conversion device 10 performs the process of step S101 again. When the processes subsequent to step S102 are performed by the predetermined number of times (step S101, Yes), the information conversion device 10 generates a conversion matrix of the hyperplane, having a positional vector of each particle defined as a normal vector (step S106), and finishes the processing.

Figure 7:
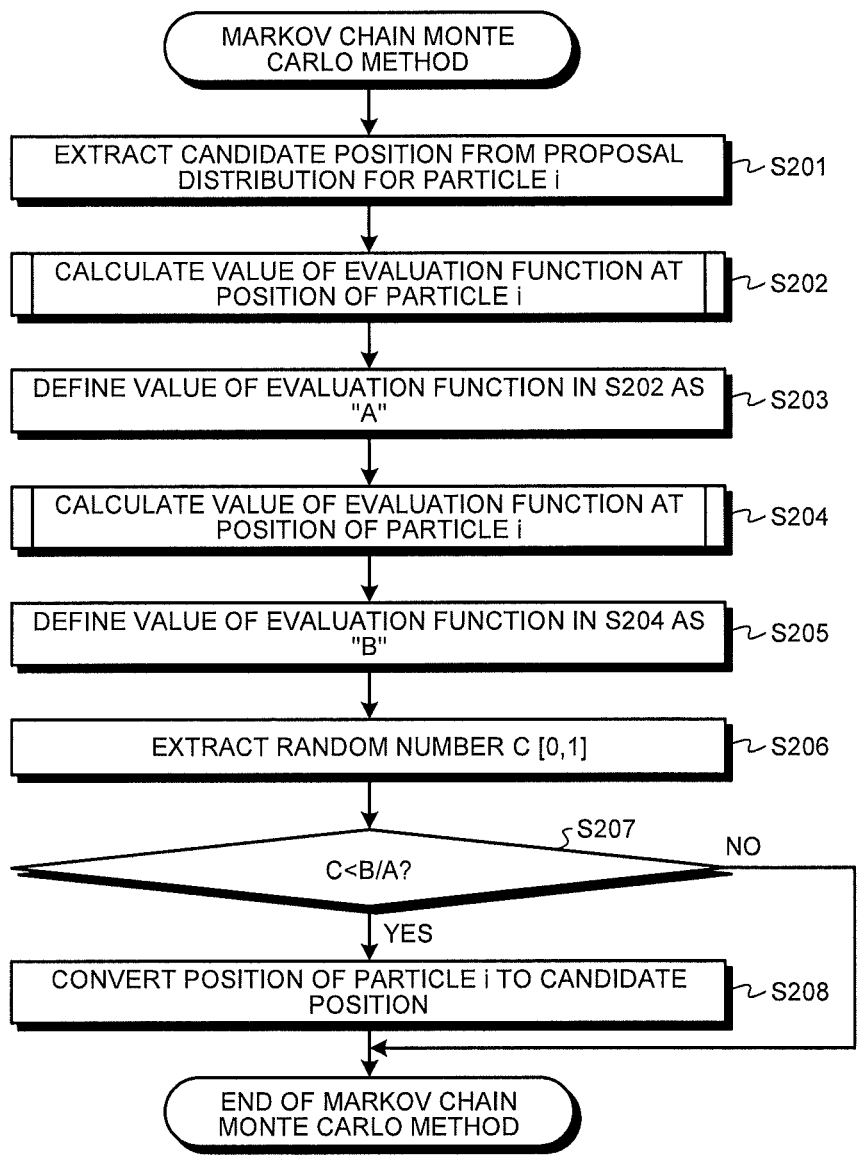
FIG. 7 is a flowchart for illustrating a flow of an MCMC method.

Next, a flow of the Markov chain Monte Carlo method (MCMC method) illustrated in step S104 in FIG. 6 will be described, using FIG. 7. FIG. 7 is a flowchart for illustrating the flow of the MCMC method. It is noted that, in an example illustrated in FIG. 7, the MCMC method is performed for the particle i.

First, the information conversion device 10 uses the Metropolis-Hastings algorithm to extract the candidate position of the particle i from the proposal distribution (step S201). Next, the information conversion device 10 calculates a value of the evaluation function at a current position of the particle i (step S202), and defines a calculation result of step S202 as "A" (step S203). Next, the information conversion device 10 calculates a value of the evaluation function at the candidate position of the particle i (step S204), and defines a calculation result of step S204 as "B" (step S205). Further, the information conversion device 10 extracts a random number C having a value of not less than "0" and not more than "1" (step S206), and determines whether a value obtained by dividing "B" by "A" is larger than "C" (step S207).

When the value obtained by dividing "B" by "A" is larger than "C" (step S207, Yes), the information conversion device 10 changes the position of the particle i to the candidate position (step S208), and finishes the processing. That is, the information conversion device 10 determines whether the value of the evaluation function at the candidate position is larger than the current value of the evaluation function, in consideration of randomness in movement of the particle i. When the value of the evaluation function at the candidate position is larger than the current value of the evaluation function, the information conversion device 10 moves the particle i to the candidate position, in consideration of the randomness in movement of the particle i. Whereas, when the value obtained by dividing "B" by "A" is not more than "C" (step S207, No), the information conversion device 10 finishes the processing.

Next, a flow of processes of steps S202 and S204 in FIG. 7 in which the value of the evaluation function is calculated by the information conversion device 10 will be described using FIGS. 8 to 11. First, a flow of processing of calculating the value of the evaluation function using formula (1) by the information conversion device 10 will be described using FIG. 8.

Figure 8:
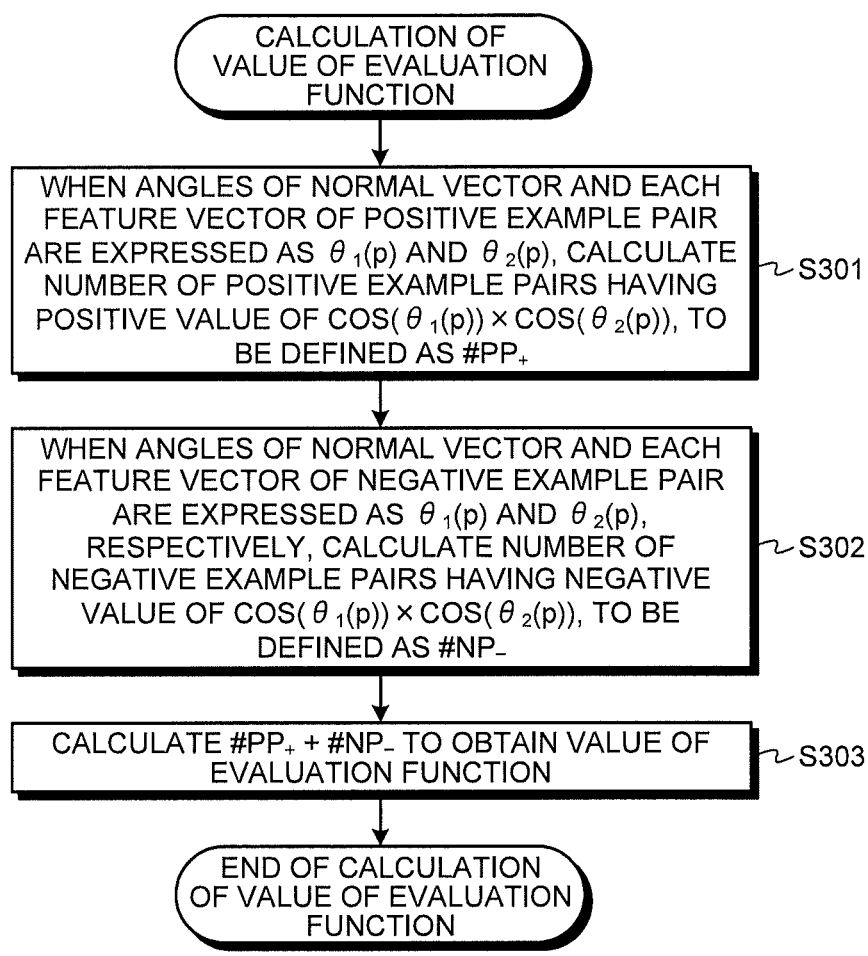
FIG. 8 is a first flowchart illustrating a flow of processing of calculating a value of an evaluation function.

FIG. 8 is a first flowchart illustrating a flow of processing of calculating the value of the evaluation function. For example, the information conversion device 10 defines the positional vector of the particle as the normal vector. When the angles of the normal vector and each feature vector included in the positive example pair are expressed as $\theta_1(p)$ and $\theta_2(p)$, respectively, the information conversion device 10 defines the number of positive example pairs having a positive value of $\cos(\theta_1(p)) \times \cos(\theta_2(p))$, as "#PP$_+$" (step S301). When the angles of the normal vector and each feature vector included in the negative example pair are expressed as $\theta_1(p)$ and $\theta_2(p)$, respectively, the information conversion device 10 defines the number of negative example pairs having a negative value of $\cos(\theta_1(p)) \times \cos(\theta_2(p))$, as "#NP$_-$" (step S302), The information conversion device 10 uses the sum of "#PP$_+$" and "#NP$_-$" to calculate the value of the evaluation function (step S303), and finishes the processing.

Figure 9:
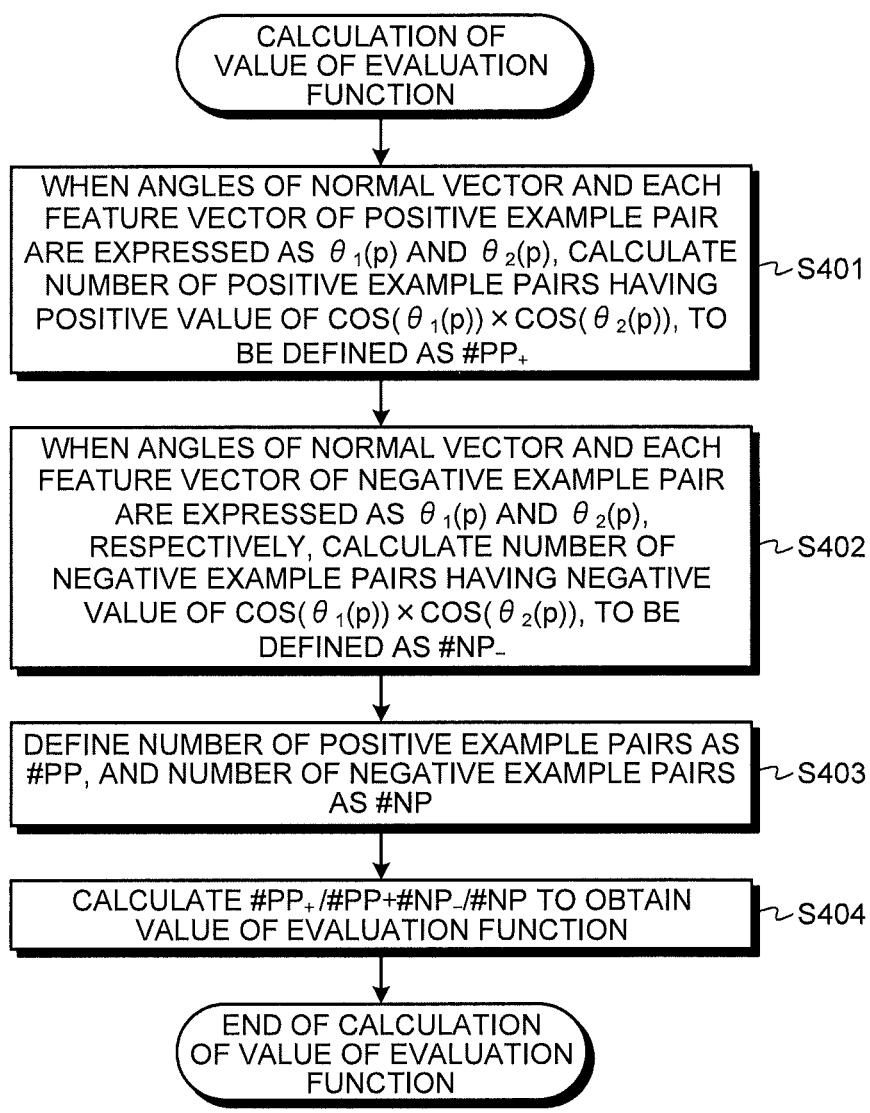
FIG. 9 is a second flowchart illustrating a flow of processing of calculating a value of an evaluation function.

Next, a flow of processing of calculating the value of the evaluation function using formula (2) by the information conversion device 10 will be described using FIG. 9. FIG. 9 is a second flowchart illustrating the flow of processing of calculating the value of the evaluation function. It is noted that step S401 in FIG. 9 has the same process as that of step S301 in FIG. 8, and step S402 in FIG. 9 has the same process as that of step S302 in FIG. 8, and descriptions thereof will be omitted.

For example, the information conversion device 10 defines the number of positive example pairs received from the data pair generation unit 12 as "#PP", and the number of negative example pairs received from the data pair generation unit 12 as "#NP" (step S403). Then, the information conversion device uses the sum of a value obtained by dividing "#PP$_+$" by "#PP", and a value obtained by dividing "#NP$_-$" by "#NP" to calculate a value of the evaluation function (step S404), and finishes the processing.

Figure 10:
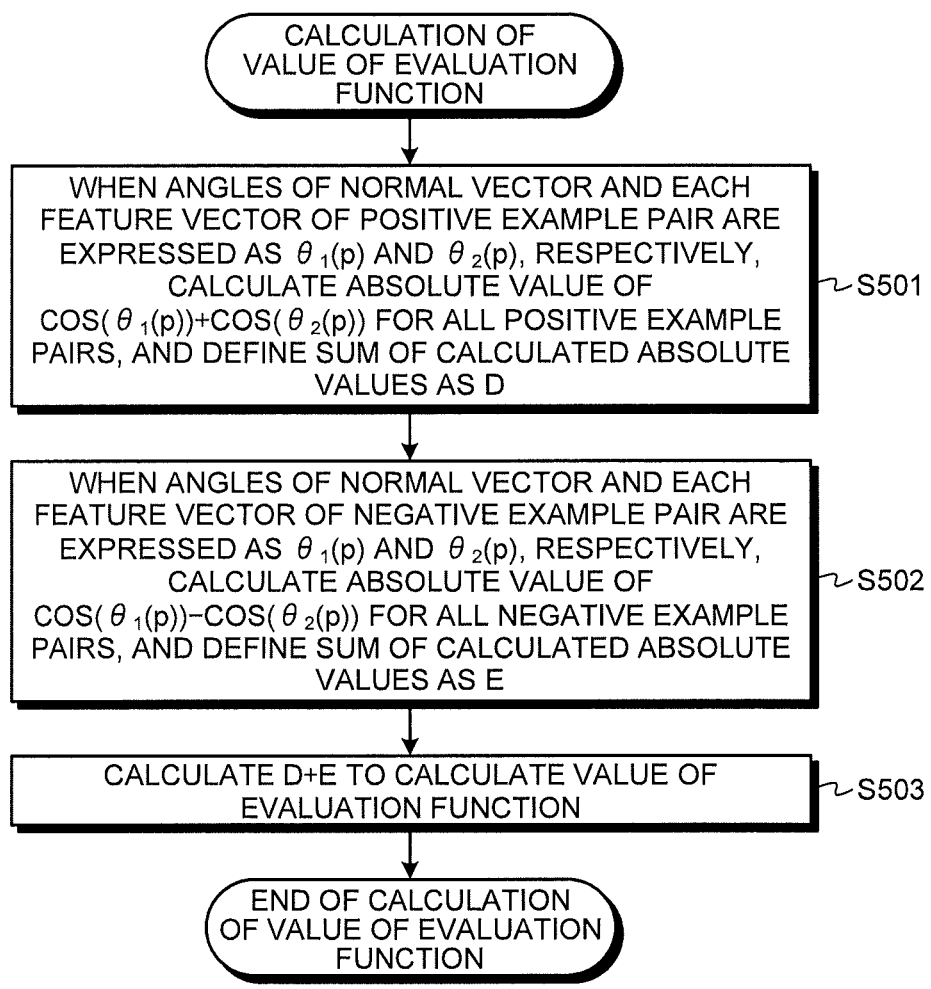
FIG. 10 is a third flowchart illustrating a flow of processing of calculating a value of an evaluation function.

Next, a flow of processing of calculating the value of the evaluation function using formula (3) by the information conversion device 10 will be described using FIG. 10. FIG. 10 is a third flowchart illustrating the flow of processing of calculating the value of the evaluation function.

For example, when the angles of the normal vector and each feature vector included in the positive example pair are expressed as $\theta_1(p)$ and $\theta_2(p)$, respectively, the information conversion device 10 calculates an absolute value of $\cos(\theta_1(p)) + \cos(\theta_2(p))$ for all positive example pairs, and defines the sum of the calculated absolute values as D (step S501). Further, when the angles of the normal vector and each feature vector included in the negative example pair are expressed as $\theta_1(p)$ and $\theta_2(p)$, respectively, the information conversion device 10 calculates an absolute value of $\cos(\theta_1(p)) - \cos(\theta_2(p))$ for all negative example pairs, and defines the sum of the calculated absolute values as E (step S502).

The information conversion device 10 uses the sum of the calculated D and E to calculate the value of the evaluation function (step S503), and finishes the processing.

Figure 11:
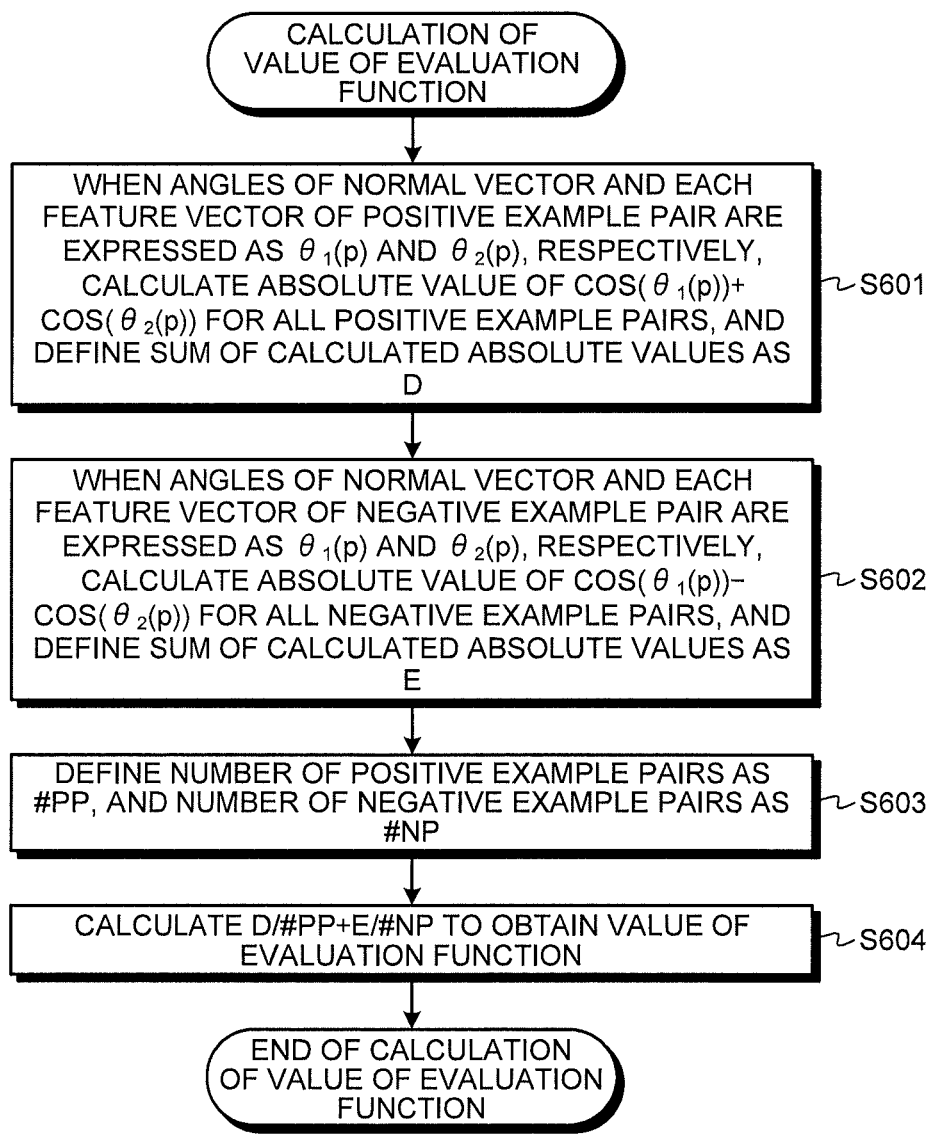
FIG. 11 is a fourth flowchart illustrating a flow of processing of calculating a value of an evaluation function.

Next, a flow of processing of calculating the value of the evaluation function using formula (4) by the information conversion device 10 will be described using FIG. 11. FIG. 11 is a fourth flowchart illustrating a flow of processing of calculating the value of the evaluation function. It is noted that step S601 in FIG. 11 has the same process as that of step S501 in FIG. 10, and step S602 in FIG. 11 has the same process as that of step S502 in FIG. 10, and descriptions thereof will be omitted.

For example, the information conversion device 10 defines the number of positive example pairs received from the data pair generation unit 12 as "#PP", and the number of negative example pairs received from the data pair generation unit 12 as "#NP" (step S603). The information conversion device calculates the value of the evaluation function from the sum of a value obtained by dividing "D" by "#PP", and a value obtained by dividing "E" by "#NP" (step S604), and finishes the processing.

Effects of First Exemplary Embodiment

As described above, the information conversion device 10 defines the positional vector of the particle on the unit sphere in a multidimensional space as the normal vector of the hyperplane dividing the feature vector space, and considers the evaluation function as the probability density function indicating a probability of existence of a particle on the unit sphere. The information conversion device 10 moves each of the positions of the plurality of particles on the unit sphere to a position at which the evaluation function has a maximum value by random walk. Then, the information conversion device 10 considers the positional vector of each particle as the normal vector of the hyperplane. Therefore, even if the number of hyperplanes to be set is increased, the information conversion device 10 may readily optimize the set of hyperplanes in which each hyperplane does not tie optimum solutions.

Further, the information conversion device 10 calculates a value obtained by dividing the value of the evaluation function upon consideration of the positional vector at the candidate position to which the particle is moved, as the normal vector, by the value of the evaluation function upon consideration of the positional vector at the current position, as the normal vector. Then, when the calculated value is larger than the random number of not less than 0 and not more than 1, the information conversion device 10 moves the position of the particle to the candidate position. Therefore, the information conversion device 10 is allowed to move the particle to the position at which the evaluation function has a maximum value. Further, the information conversion device 10 holds the randomness in movement of the particle to prevent converging of the values of the evaluation function to a local maximum value.

Further, the information conversion device 10 repetitively conducts the random walk process on the particle on the unit sphere, a predetermined number of times. Therefore, the information conversion device 10 is allowed to obtain the hyperplane each having a normal vector closer to a maximum value, or a set of hyperplanes further optimized.

Further, the information conversion device 10 selects a positive example pair and a negative example pair. The information conversion device 10 considers an evaluation function having the value reduced when the positive example pair is divided into the different areas, and increased when the negative example pair is divided into the different areas, as the probability density function. Therefore, the information conversion device 10 is allowed to calculate the set of hyperplanes for classifying feature vectors for each label.

Further, the information conversion device 10 counts the number "$\#PP_+$" of positive example pairs including both feature vectors in one of the areas divided by the hyperplane, and the number "$\#NP_-$" of negative example pairs including two feature vectors divided into the different areas by the hyperplane. The information conversion device 10 uses an evaluation function in which the sum of "$\#PP_+$" and "$\#NP_-$" is defined as an index, and a Napier's constant is defined as a base. Therefore, the information conversion device 10 is allowed to calculate the set of hyperplanes for classifying feature vectors for each label.

Further, the information conversion device 10 uses an evaluation function in which the sum of a value obtained by dividing "$\#PP_+$" by the number "$\#PP$" of positive example pairs, and a value obtained by dividing "$\#NP_-$" by the number "$\#NP$" of negative example pairs is defined as an index, and the Napier's constant as the base. Therefore, the information conversion device 10 is allowed to optimize the set of hyperplanes, according to a rate between data optimally classified by the hyperplane and data not optimally classified by the hyperplane.

Further, the information conversion device 10 adds, to all positive example pairs, an absolute value of the sum of cosine values of angles between the feature vectors included in the positive example pair and the normal vector. Further, the information conversion device 10 adds, to all negative example pairs, an absolute value of a difference between cosine values of the angles between the feature vectors included in the negative example pair and the normal vector. The information conversion device uses an evaluation function in which the sum of the value added to the positive example pair and the value added to the negative example pair is defined as an index, and the Napier's constant as the base. Therefore, the information conversion device 10 is allowed to calculate the set of hyperplanes for comprehensive classification, such as, appropriate divisibility between the whole of the positive example pairs and the whole of the negative example pairs.

Further, the information conversion device uses an evaluation function in which the sum of a value obtained by dividing the value added to the positive example pair by the number of positive example pairs, and a value obtained by dividing the value added to the negative example pair by the number of negative example pairs is defined as an index, and the Napier's constant as the base. Therefore, the information conversion device 10 is allowed to calculate the set of hyperplanes for comprehensive classification, in consideration of a rate of positive example pairs and negative example pairs properly classified.

Second Exemplary Embodiment

The exemplary embodiment of the present invention has been described above, but the exemplary embodiment may be carried out in various different modes other than the above-mentioned exemplary embodiment. Therefore, as a second exemplary embodiment, another exemplary embodiment included in the present invention will be described below.

(1) About Selection of Feature Vector

The above-mentioned information conversion device 10 selects, as the positive example pair, two feature vectors to which the same label is applied, and selects, as a negative example pair, two feature vectors to which different labels are applied. However, the exemplary embodiment is not limited to this configuration. For example, the information conversion device 10 is allowed to select the positive example pair and the negative example pair including an arbitrary number of feature vectors.

Further, the information conversion device 10 obtains a data set including at least three feature vectors, from the learning data storage unit 11. The information conversion device 10 may generate the positive example pair and the negative example pair from the obtained data set, to calculate a value of the evaluation function using the generated positive example pair and the negative example pair.

Further, the above-mentioned information conversion device 10 reselects the positive example pair and the negative example pair, each time the MCMC method is performed for all particles. However, the exemplary embodiment is not limited to this configuration, and for example, the information conversion device 10 may reselect the positive example pair and the negative example pair, each time the MCMC method is performed for one particle.

(2) About Embodiment

The above-mentioned information conversion device 10 is a device independent of the information retrieval device 20. However, the exemplary embodiment is not limited to this configuration, and for example, the information retrieval device 20 may include a function of the information conversion device 10. Further, the information conversion device 10 may have a function performed by the binary conversion unit 23 of the information retrieval device 20, generate the conversion matrix for the feature vector stored in the information retrieval device in operation, and use the generated conversion matrix to perform processing of generating the binary string. Further, a function of the information conversion device 10 may be provided by a so-called cloud system.

(3) About Mathematical Formula

The mathematical formulae used for calculation of importance by the information conversion device 10 are only examples, and information conversion device 10 may use a mathematical formula of arbitrary type. That is, the information conversion device 10 may use an arbitrary mathematical formula, as far as the conversion matrix is obtained for projecting the feature vectors to the binary string according to a distance relationship between the feature vectors or the label applied to the feature vector. Further, the information conversion device 10 may set a parameter or the like for obtaining the conversion matrix, or may use another evaluation function.

(4) Program

Figure 12:
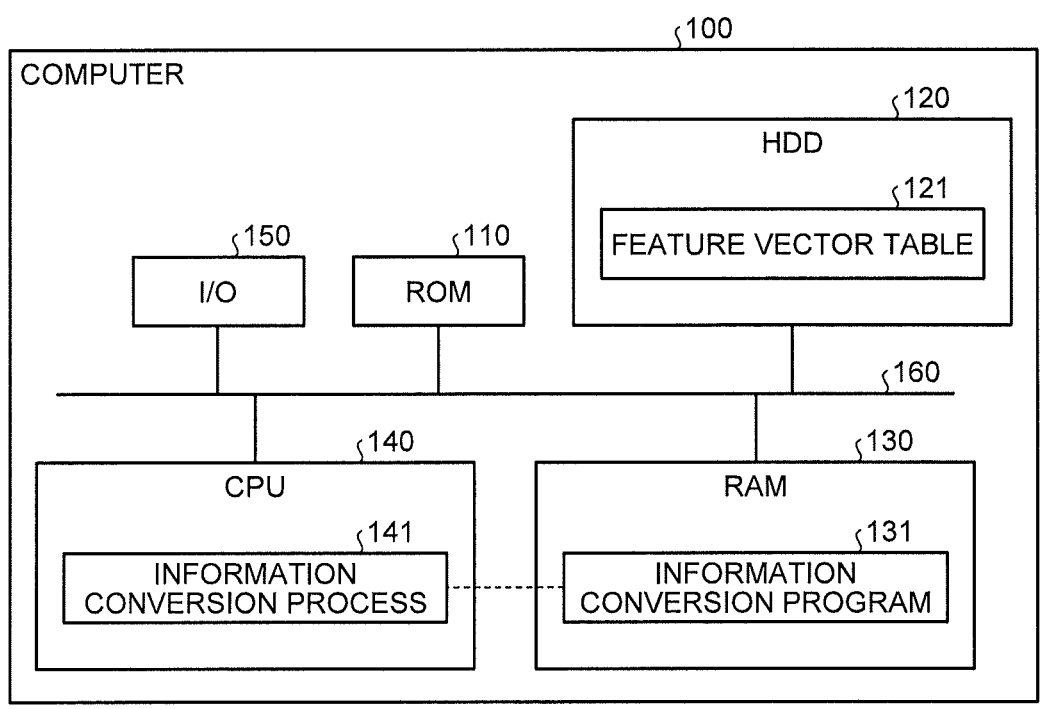
FIG. 12 is a diagram for illustrating an example of a computer for executing an information conversion program.

A description has been made of the information conversion device 10 according to the first exemplary embodiment which uses hardware to achieve various processing. However, the exemplary embodiment is not limited to this configuration, and a previously prepared program may be executed by a computer of the information conversion device 10 to achieve the various processing. Therefore, an example of the computer for executing the program having a function similar to that of the information conversion device 10 described in the first exemplary embodiment will be descried below, using FIG. 12. FIG. 12 is a diagram for illustrating an example of the computer for executing an information conversion program.

In a computer 100 exemplified in FIG. 12, read only memory (ROM) 110, a hard disk drive (HDD) 120, random access memory (RAM) 130, and a central processing unit (CPU) 140 are connected by a bus 160. Further, the computer 100 exemplified in FIG. 12 includes an input output (I/O) 150 for transmission and reception of packets.

The HDD 120 stores a feature vector table 121 storing data similar to the data in the learning data storage unit 11. Further, an information conversion program 131 is previously held in the RAM 130. The CPU 140 reads the information conversion program 131 from the RAM 130 and executes the information conversion program 131, and in an example illustrated in FIG. 12, the information conversion program 131 functions as an information conversion process 141. It is noted that information conversion process 141 has a function similar to those of the data pair generation unit 12, the particle position calculation unit 13, and the conversion matrix generation unit 14 illustrated in FIG. 1.

It is noted that the information conversion program described in the present exemplary embodiment is achieved by executing a previously prepared program by the computer such as a personal computer or a workstation. This program is allowed to be distributed through a network such as the Internet. Further, this program is recorded in a computer-readable recording medium such as a hard disk, a flexible disk (FD), a compact disc read only memory (CD-ROM), a magneto optical disc (MO), or a digital versatile disc (DVD). Further, this program is also allowed to be read from the recording medium by the computer and executed.

According to one embodiment, a set of hyperplanes is allowed to be readily optimized.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An authentication method comprising:
receiving data for authentication;
extracting a feature vector indicating features of the received data;
first moving positions of a plurality of particles on a unit sphere in a multidimensional space according to a value of a probability density function, the probability density function indicating a probability of existence of a particle on the unit sphere, by a processor;
converting the feature vector to a binary string, using a normal vector of a hyperplane that divides the multidimensional space, by the processor; and
authenticating the data based on the converted feature vector, the first moving including:
calculating a positional vector of the particle on the unit sphere as the normal vector of the hyperplane,
obtaining an evaluation function configured to evaluate the hyperplane as the probability density function,
extracting a movement destination candidate of the particle,
calculating a value obtained by dividing a value of the evaluation function according to a positional vector of the particle moved to the movement destination candidate by a value of the evaluation function according to a current positional vector of the particle, and
second moving the particle to an extracted movement destination candidate, upon obtaining the calculated value larger than a random number of not less than 0 and not more than 1, or preventing movement of the particle, upon obtaining the calculated value not larger than the random number.

2. The authentication method according to claim 1, wherein the first moving is repetitively performed a predetermined number of times, by the processor.

3. The authentication method according to claim 1, wherein the evaluation function includes:
selecting a pair of feature vectors to which the same label is applied, as a positive example pair,
selecting a pair of feature vectors to which different labels are applied, as a negative example pair, and
having a value reduced upon dividing two feature vectors included in the positive example pair into different areas by the hyperplane, and the value increased upon dividing two feature vectors included in the negative example pair into different areas by the hyperplane.

4. The authentication method according to claim 3, wherein the evaluation function includes:
selecting a plurality of the positive example pairs and a plurality of the negative example pairs,
defining, as an index, the sum of the number of positive example pairs including both feature vectors in one of the areas divided by the hyperplane, of the selected positive example pairs, and the number of negative example pairs including two feature vectors divided into different areas by the hyperplane, of the selected negative example pairs, and defining a Napier's constant as a base.

5. The authentication method according to claim 3, wherein the evaluation function includes:
selecting a plurality of the positive example pairs and a plurality of the negative example pairs, and
defining, as an index, the sum of a ratio of positive example pairs including both feature vectors in one of the areas divided by the hyperplane, of the selected positive example pairs, and a ratio of negative example pairs including two feature vectors divided into different areas by the hyperplane, of the selected negative example pairs, and defining a Napier's constant as a base.

6. The authentication method according to claim 3, wherein the evaluation function includes:
selecting a plurality of the positive example pairs and a plurality of the negative example pairs,
adding, to all the positive example pairs, an absolute value obtained by adding a cosine value of an angle between one feature vector included in the positive example pair and a normal vector of the hyperplane, and a cosine value of an angle between the other feature vector the normal vector of the hyperplane,
adding, to all the negative example pair, an absolute value of a difference between a cosine value of an angle between one feature vector included in the negative example pair and a normal vector of the hyperplane, and a cosine value of an angle between the other feature vector and the normal vector of the hyperplane and defining, as an index, the sum of a value added to the positive example pair and a value added to the negative example pair, and defining a Napier's constant as a base.

7. The authentication method according to claim 3, wherein the evaluation function includes:
selecting a plurality of the positive example pairs and a plurality of the negative example pairs,
adding, to all the positive example pairs, an absolute value obtained by adding a cosine value of an angle between one feature vector included in the positive example pair and a normal vector of the hyperplane, and a cosine value of an angle between the other feature vector the normal vector of the hyperplane,
adding, to all the negative example pair, an absolute value of a difference between a cosine value of an angle between one feature vector included in the negative example pair and a normal vector of the hyperplane, and a cosine value of an angle between the other feature vector and the normal vector of the hyperplane and
defining, as an index, the sum of a value obtained by dividing a value added to the positive example pair by the number of the positive example pairs, and a value obtained by dividing a value added to the negative example pair by a value of the negative example pair, and defining a Napier's constant as a base.

8. An authentication device comprising:
a processor configured to execute a process including:
receiving data for authentication;
extracting a feature vector indicating features of the received data;
calculating positions to which a plurality of particles on a unit sphere are moved in a multidimensional space according to a value of a probability density function configured to indicate a probability of existence of a particle on the unit sphere;
converting the feature vector to a binary string, using a normal vector of a hyperplane that divides the multi-dimensional space; and
authenticating the data based on the converted feature vector, the calculating including
calculating a positional vector of the particle on the unit sphere as the normal vector of the hyperplane,
obtaining an evaluation function configured to evaluate the hyperplane as the probability density function,
extracting a movement destination candidate of the particle,
calculating a value obtained by dividing a value of the evaluation function according to a positional vector of the particle moved to the movement destination candidate by a value of the evaluation function according to a current positional vector of the particle, and
second moving the particle to an extracted movement destination candidate, upon obtaining the calculated value larger than a random number of not less than 0 and not more than 1, or preventing movement of the particle, upon obtaining the calculated value not larger than the random number.

9. A non-transitory computer-readable recording medium storing an authentication program that causes a computer to execute a process comprising:
receiving data for authentication;
extracting a feature vector indicating features of the received data;
first moving positions of a plurality of particles on a unit sphere in a multidimensional space according to a value of a probability density function, the probability density function indicating a probability of existence of a particle on the unit sphere;
converting the feature vector to a binary string, using a normal vector of a hyperplane that divides the multi-dimensional space; and
authenticating the data based on the converted feature vector, the first moving including
calculating a positional vector of the particle on the unit sphere as the normal vector of the hyperplane,
obtaining an evaluation function configured to evaluate the hyperplane as the probability density function,
extracting a movement destination candidate of the particle,
calculating a value obtained by dividing a value of the evaluation function according to a positional vector of the particle moved to the movement destination candidate by a value of the evaluation function according to a current positional vector of the particle, and
second moving the particle to an extracted movement destination candidate, upon obtaining the calculated value larger than a random number of not less than 0 and not more than 1, or preventing movement of the particle, upon obtaining the calculated value not larger than the random number.

* * * * *